United States Patent [19]
Schindler, Jr.

[11] Patent Number: 4,638,541
[45] Date of Patent: Jan. 27, 1987

[54] TOOLS FOR REPAIRING A DIESEL ENGINE CYLINDER HEAD

[76] Inventor: Edward F. Schindler, Jr., 4917 Orange Grove Dr., Houston, Tex. 77039

[21] Appl. No.: 623,380

[22] Filed: Jun. 22, 1984

[51] Int. Cl.[4] B23P 6/02; B23P 19/08; B25B 13/08

[52] U.S. Cl. 29/402.06; 29/222; 29/229; 29/402.01; 29/402.08; 81/57.32; 408/67; 408/80; 408/83.5; 408/137; 408/153; 408/181; 409/307

[58] Field of Search 408/67, 79, 80, 82, 408/153, 181, 75, 81, 83, 83.5, 137; 409/304-307; 29/222, 229, 402.01-402.06, 402.08; 81/55, 57.32, 57.36, 3 F, 13

[56] References Cited

U.S. PATENT DOCUMENTS

| | | | |
|---|---|---|---|
| 37,898 | 3/1863 | Bonanzo | 409/306 |
| 1,360,444 | 11/1920 | Roline et al. | 408/82 |
| 1,977,491 | 10/1934 | Schaaf | 409/305 |
| 2,004,741 | 6/1935 | Zimmerman | 408/81 X |
| 2,237,450 | 4/1941 | Sample | 408/204 X |
| 2,357,139 | 8/1944 | Seme | 29/229 |
| 2,534,759 | 12/1950 | Dulli | 409/307 X |
| 2,830,500 | 4/1958 | Schultis | 408/137 |
| 3,030,700 | 4/1962 | Jensen | 29/229 |
| 3,264,904 | 8/1966 | Moore | 408/81 X |
| 3,470,600 | 10/1969 | Hosbach | 29/243.57 |
| 3,483,606 | 12/1969 | Ethridge | 29/229 |
| 3,518,738 | 7/1970 | Porter | 408/153 X |
| 3,540,319 | 11/1970 | Greenberg | 408/79 |
| 3,731,559 | 5/1973 | Krupke | 81/57.32 X |
| 3,995,360 | 12/1976 | Millheiser | 29/229 |
| 4,011,793 | 3/1977 | Grimsley | 408/80 |
| 4,050,836 | 9/1977 | Anders | 408/80 X |
| 4,544,308 | 10/1985 | Westberg | 408/82 X |

*Primary Examiner*—Gil Weidenfeld
*Assistant Examiner*—Steven C. Bishop
*Attorney, Agent, or Firm*—Pravel, Gambrell, Hewitt & Kimball

[57] ABSTRACT

A tool kit is provided for repairing the snap ring grooves of a cam follower bore in a diesel engine cylinder head without removing the cylinder head from the cylinder block. The tool kit includes a cutting tool which will both enlarge the cam follower bore to allow the use of an oversized spring retainer and cut an enlarged snap ring groove to allow the use of a more substantial plate-type snap ring. A snap ring installation tool allows for easy placement of the snap ring in the cam follower bore. A concentric wrench having concentric yet independently movable sockets for quick valve and fuel injector clearance adjustment is included.

32 Claims, 17 Drawing Figures

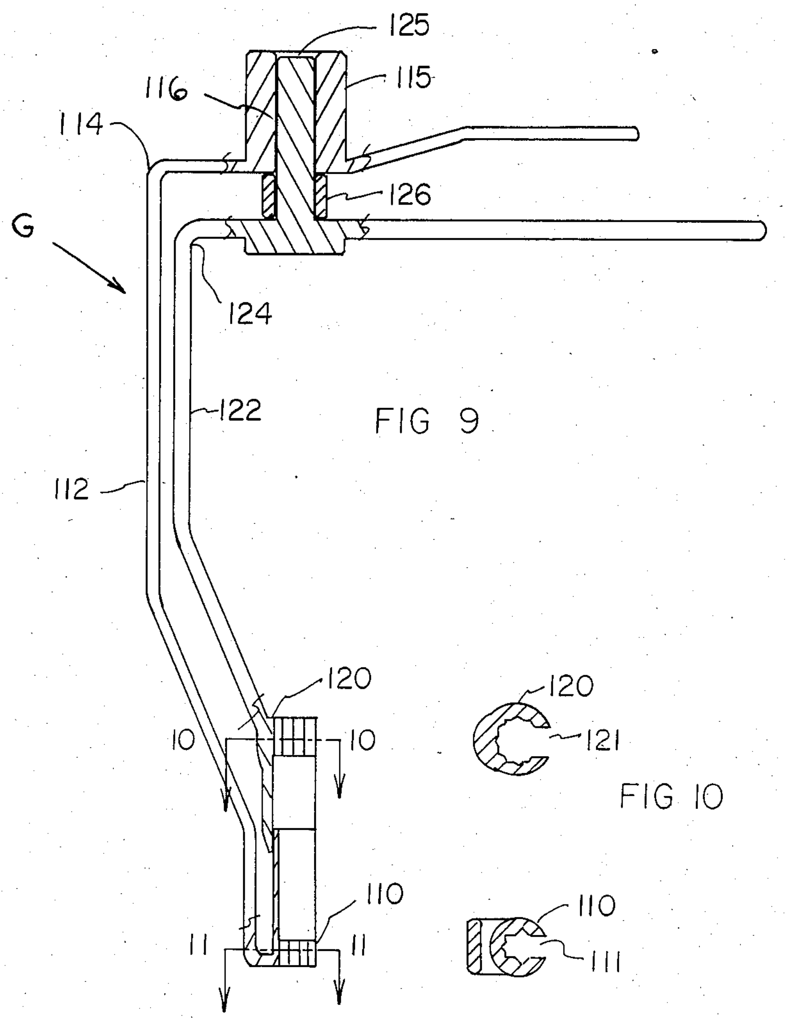
FIG 9
FIG 10
FIG 11
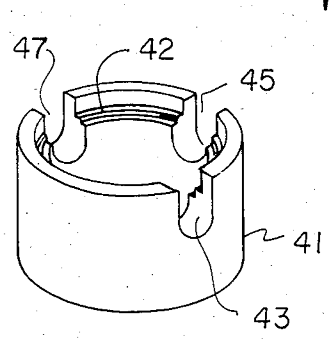
FIG 14
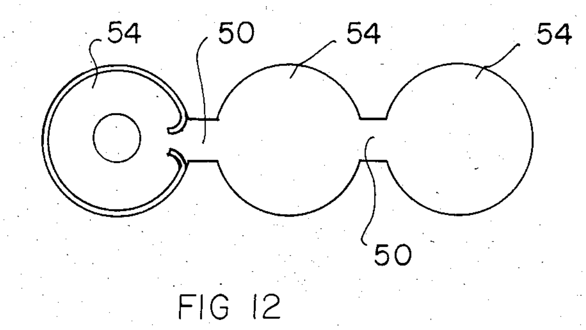
FIG 12

TOOLS FOR REPAIRING A DIESEL ENGINE CYLINDER HEAD

SPECIFICATION

FIELD OF THE INVENTION

The present invention relates to tools designed to repair diesel engine cylinder heads and, more particularly, to enlarge a snap ring groove in an engine cylinder head and install a snap ring in the repaired snap ring groove without removing the cylinder head from the cylinder block. The invention also relates to a kit with components for performing these operations. Additionally, another tool is useful in adjusting exhaust valve clearance and setting the fuel injector.

BACKGROUND OF THE INVENTION

In diesel engines and specifically such engines produced by Detroit Diesel, valve rockers in the cylinder head are actuated by a roller cam followers and pushrod arrangements. Cam followers are preloaded by springs that are concentric with pushrods which are held within the cylinder head by snap rings mounted in cooperating grooves. Often these snap rings which are in the form of shaped wire sections or the snap ring grooves are damaged and repair of the grooves or replacement of the rings is necessary. Normally when such a snap ring groove became chipped or cracked, it is necessary to remove the cylinder head from the engine in order to replace it with a new head, which is an expensive and time consuming operation.

SUMMARY OF THE INVENTION

Briefly, the present invention relates to new and improved tools for repairing the snap ring groove of a cam follower spring in a diesel engine without removing the cylinder head from its associated block. The tools can be utilized alone or as part of a kit. The tools include a groove cutter, a snap ring installer and a valve adjustment wrench.

The groove cutter includes upper and lower members which are joined through complementary threads. The lower member is a combined anchor and spacer and the upper member is a cutting and refuse collector. The lower member has a cross-sectional size substantially that of the cam follower bore and includes an anchor for releasably anchoring the element in the cam follower bore. The upper member includes a replaceable, radially adjustable cutter and a receptacle located below the cutter for catching metal cuttings.

Typically, two cutters are used. A first cutter cleans up nicks or cracks in the bore and enlarges the bore adjacent to the snap ring groove so that an oversized spring retainer and plate type snap ring may be used. When the first cutter is used to enlarge or clean the bore, the lower tool element is anchored in the cam follower bore. As the cutter is rotated, the threaded interconnection between the anchor element and cutting element operates to pull the upper tool element downward. The second cutter is used when the lower tool element is employed as a spacer and not anchored in the bore. In this mode, the second cutter operates to enlarge the snap ring groove so that a more substantial snap ring can be used in place of the standard wire type snap ring.

The snap ring installer is used to install a more substantial snap ring in the groove after it has been enlarged by the cutting tool. The installer includes a core element with an axial bore designed to fit over the pushrod that is normally located between an upper spring retainer and lock nut. The core element is long enough to compress the cam follower spring when the pushrod lock nut is tightened.

An outer element with pins that extend to the lower face of the core element is concentric with the core element to retain the snap ring in its compressed condition. The outer element can be axially moved without rotation relative to the core element for moving the pins away from the core element face and releasing the snap ring into the groove.

The third tool is a combination wrench which allows for quick and easy adjustment of the valve clearance and fuel injector clearance. The combination wrench includes concentric, open-sided sockets which are capable of independent rotational and axial movement so that the operator can hold the pushrod stationery and at the same time turn the lock nut. The tool is also capable of simultaneous holding the lock nut and turning of the pushrod. The concentric sockets include slots coextensive to allow location of the sockets over the installed pushrod and independent handles which allow independent rotation while retaining the sockets in their concentric orientation.

These tools which can be combined in a kit allow for rapid repair of a damaged snap ring and/or associated groove, particularly in a Detroit diesel engine, without removing the cylinder head from the cylinder block, enable the operator to clean and cut an enlarged snap ring groove, install a new oversized, more substantial snap ring and, adjust the valve rapidly.

BRIEF DESCRIPTION OF THE DRAWINGS

FIG. 9 is a plan view partially in cross-section of the combination wrench element of the present invention;

FIG. 10 is a cross-sectional view along line 10—10 of FIG. 9;

FIG. 11 is a cross-sectional view along line 11—11 of FIG. 9;

FIG. 12 is a plan view of the cam follower bores of a Detroit diesel cylinder head;

FIG. 14 is an isometric view of the depth guage of the present invention.

DESCRIPTION OF PREFERRED EMBODIMENTS

Figure 1:
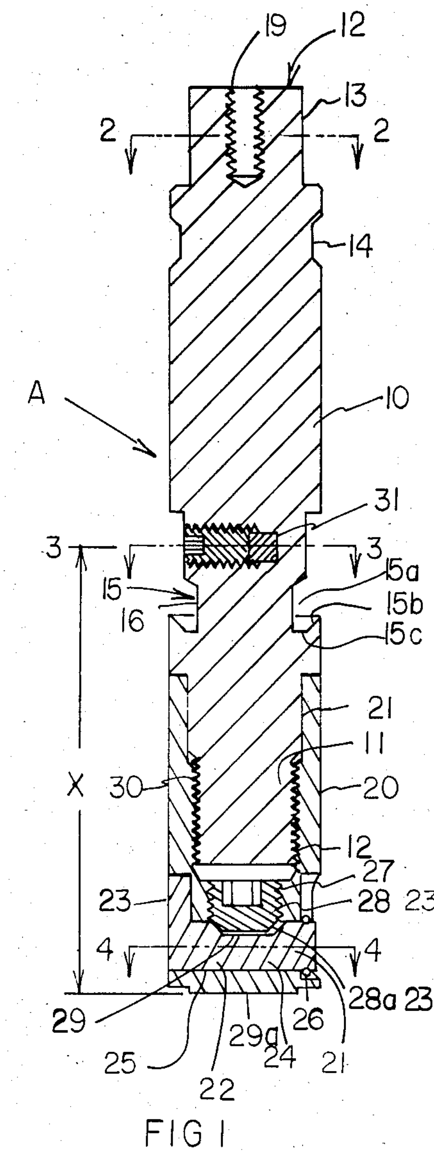
FIG. 1 is a longitudinal cross-sectional view of the cutting tool element of the present invention.
Figure 2:
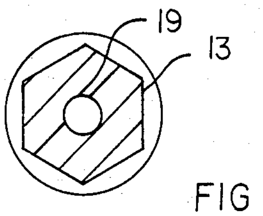
FIG. 2 is a transverse cross-sectional view along line 2—2 of FIG. 1.
Figure 3:
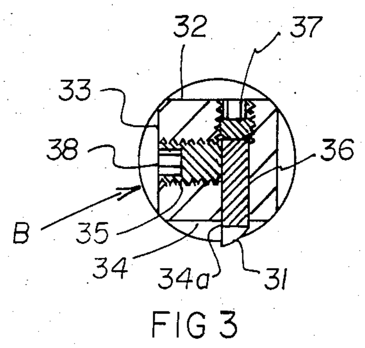
FIG. 3 is a transverse cross-sectional view along line 3—3 of FIG. 1.

Referring to FIG. 1, a groove cutting tool of the present invention will first be described. The groove cutting tool is designated by letter A and formed of an upper cutting member 10 and a lower anchor member 20 which are joined through complementary threads 30. A hex-shaped head 13 (FIG. 2) is formed on the upper end 12 of cutting member 10 for receiving a wrench to turn the cutting tool. A threaded hole 19 is formed in the hex-head 13 for receiving a threaded stud which can remove the tool from the bore in a cylinder head when it is stuck. The upper end 12 of cutting member 10 further includes a gripping groove 14 machined therein to allow for easy removal from the cam follower bore, as described in greater detail below.

A cutting element 31 is mounted in the upper member 10 in a recess that includes three flat surfaces 32, 33 and 34 and two bores 35 and 36 intersecting at right angles. One bore 36 extends from flat 32 to flat 34 and is adapted at one end 34*a* to receive the cutting element 31. The opposite end of bore 36, (at flat 32) is adapted to receive a threaded set screw 37 which controls the position of cutting element 31. The bore 35, which extends from flat 33 and intersects bore 36, is adapted to receive a set screw 38 which locks the cutting element 31 in the desired position.

A receptacle 15 is formed in the cutting member 10 and located directly below the cutting element 31 for catching debris generated by the action of the cutting element 31. The receptacle 15 is formed of an opening 15*a*, a wall 15*b* which slants downwardly and inwardly from the surface of member 10, and a floor 15*c* which extends from the wall 15*b* to core element 16 of upper member 10.

The lower anchor member 20 operates both as an anchor and as a spacer. When the upper member 10 and lower member 20 are threaded together as shown in FIG. 1, the distance X from the lower face of member 20 to the cutting element 31 is equal to the distance from the cam to the cam follower spring groove of a Detroit diesel engine cylinder head so that the lower member 20 functions as a spacer to maintain cutting element 31 in the proper position for cutting or enlarging the cam follower pushrod, snap ring groove.

Figure 4A:
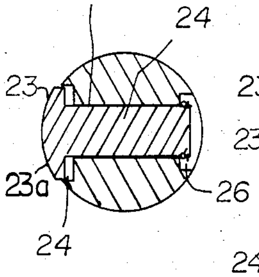
FIG. 4*a* is a transverse cross-sectional view along line 4—4 of FIG. 1 showing the locking element in its expanded position.
Figure 4B:
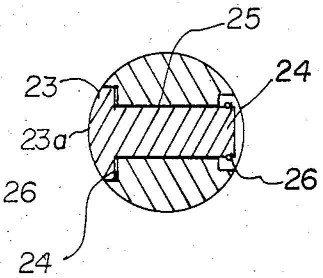
FIG. 4*b* is a transverse cross-sectional view along line 4—4 of FIG. 1 showing the locking element in its retracted position.
Figure 13:
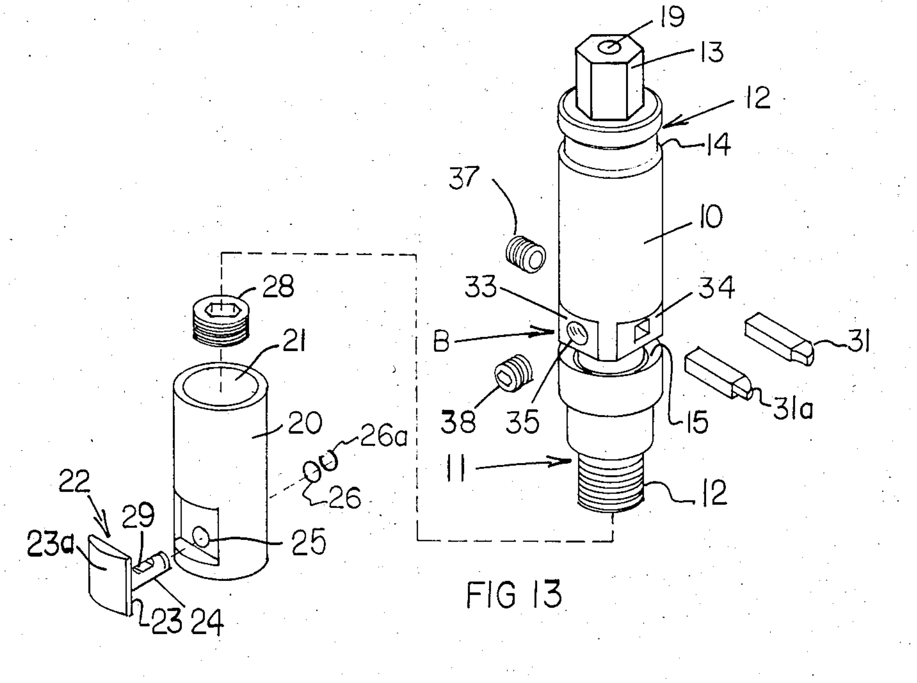
FIG. 13 is an exploded isometric view of the cutting element of the present invention.

The lower anchor member 20 also includes anchor means (FIGS. 4*a* and 4*b*) which allow the lower member 10 to be anchored in the cam follower spring bore. The anchor element which is shown in FIG. 4*a* in its extended position and in FIG. 4*b* in its retracted position, includes an anchor 22 which has a head 23 and a leg 24. The head 23 includes an arcuate surface 23*a* having the same curvature as the outer surface of the anchor member 20 and adapted to fit within an opening 25 formed in the anchor member 20. A leg 24 of the anchor 22 fits in a hole 25 which extends from the opening 24 through the anchor member 20. The anchor 22 is held in place by a snap-ring 26*a* located adjacent to an O-ring 26 mounted on the leg 24.

The anchor 22 is moved outwardly for anchoring the anchor member 20 through the interaction of a set screw 28 and a slot 29 in the leg 24 as shown in FIG. 1. The set screw 28 is located in a bore 27 which intersects the hole 25 and includes a truncated conical head 28*a* which is adapted to intersect the slot 29 formed in the leg 24. The slot 29 is offset so that as the set screw 28 is tightened into the bore 27, the head 28*a* engages a sidewall of the slot 29 and forces the anchor 22 radially outward from its retracted position (FIG. 4*b*) to its extended position (FIG. 4*a*). This outward movement compresses the O-ring 26 which operates as a spring to return the anchor 22 to its retracted position when the set screw 28 is withdrawn from the slot 29.

The groove cutting tool A is used to clean up and slightly enlarge the inner surface of the cam follower bore adjacent the snap ring groove and to cut and enlarge the snap ring groove so that a more substantial circular plate, snap ring may be employed, all without removing the cylinder head from the cylinder block. After the pushrod and spring assembly and the cam follower are removed from the bore, the lower element 20 is inserted in the bore with the lower surface 29*a* contacting the base circle of a cam lobe. The set screw 28 is rotated with an appropriate sized hex wrench which forces the anchor 22 radially outward into contact with the bore, thereby locking anchor element 20 in position. An appropriate cutting element 31 is inserted into the upper element 10 and the depth of the cut is adjusted to the position determined by a depth gauge 41 of the type shown in FIG. 14 with the set screw 37 and then locked into position by the set screw 38. The upper element 10 is inserted into the bore 51 so that the cutting element 31 is positioned to enlarge the bore 51 as shown in FIG. 12. The upper element 10 is rotated to engage threads 30.

The depth gauge 41 as shown in FIG. 14 is a tubular piece which has an internal diameter substantially the same as the outside diameter of the cutting tool A. One edge 41*a* of depth gauge 41 has three slots 43, 45, and 47 which allows adjustment of set screws 37 and 38 when the depth gauge 41 is fitted around cutting tool A. The edge 41*a* of depth gauge 41 also includes a series of stepped grooves 42 of decreasing internal diameter which are used to determine the depth of the cut of cutting element 31 or 31*a*.

As the upper element 10 is rotated with a wrench the threaded interconnection between the upper element 10 and the anchor element 20 pulls the upper element into the bore, causing the cutting element 31 to enlarge the bore and clean up any nicks or chips in the bore. Debris from the cutting falls into the receptacle 15 which is emptied by removing upper element 10 from the bore after several turns. When the upper element 10 reaches the position shown in FIG. 1 where it cannot move any lower, the upper element 10 is removed from the bore and the cutting element 31 adjusted outwardly and the cutting operation repeated. Typically 0.035 inch is removed from the cam follower bore requiring three or four adjustments of the cutting member 31.

After the desired material has been removed from the bore, the upper element 10 is removed and the anchor element 20 is released and removed from the bore. A second cutting element 31*a* which is adapted to cut a snap ring groove, is inserted into upper element 10 and its cut depth adjusted with depth gauge 40 as described above. The upper element 10 and the lower element 20 are threaded completely together as shown in FIG. 1 so that lower element 20 acts as a spacer.

The combind tool is inserted in the cam follower bore with the cutting element 31 projecting into the slot 50 in the cam follower bore 54. The tool is bottomed in the bore so that the lower surface 29*a* of lower element 20 contacts the base circle of a cam lobe, thereby spacing cutting element 31 in the proper location to enlarge the snap ring groove. When the composite tool is rotated, it is removed after each rotation to empty receptacle 15 and adjust the cutting element 31*a* outwardly. This procedure is repeated until a snap ring groove of sufficient depth and size to receive a heavy duty, plate-type snap ring is created, which is more substantial than the wire-type snap ring normally used.

Figure 5:
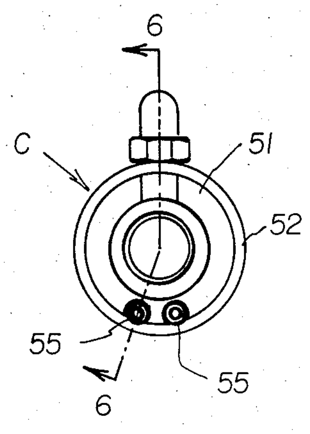
FIG. 5 is an end view of one embodiment of a snap ring installation tool of the present invention.
Figure 6A:
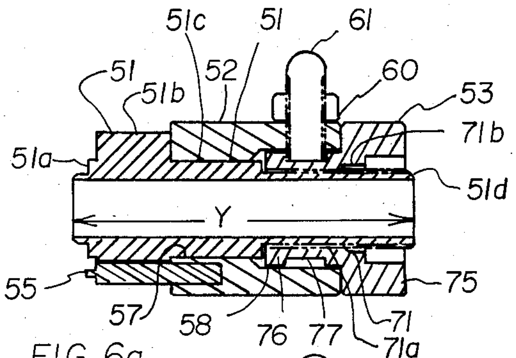
FIG. 6*a* is a longitudinal cross-sectional view along line 6—6 of FIG. 5 showing the snap ring tool in its contracted position.
Figure 6B:
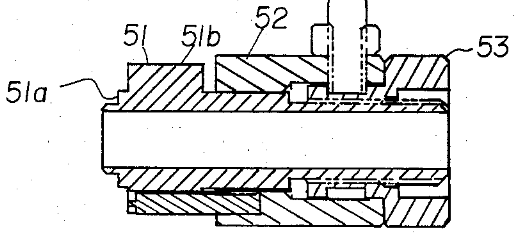
FIG. 6*b* is a longitudinal cross-sectional view along line 6—6 of FIG. 5 showing the snap ring tool in its expanded position.

A second tool designated by letter C is a snap ring installation tool (FIG. 5), which is made up of a core element 51, an outer element 52 and adjustment element 53, the latter controlling the axial movement of the outer element 52 relative to the core element 51. A lower face 51*a* of the core element 51 is adapted to contact the upper spring seat of a pushrod assembly in a Detroit diesel engine cylinder head (not shown). The core element 51 is designed to fit between the upper spring seat and a lock nut so that the spring can be compressed by tightening the lock nut. The core element 51 includes a lower head 51*b* with a radius substantially that of the cam follower bore, a central body segment 51*c* which has a radial dimension less than that of lower head 51*b* and is adapted to receive the outer element 52, and a tail portion 51*d* which is threaded to receive the outer, adjustment element 53.

The outer element 52 is cylindrical with two pins 55 threaded or pressed to extend axially from its lower face 56. The outer element 52 includes a lower, axial bore 57 for receiving body segments 51*c* of the core element 51 and an upper axial bore 58 of larger radius to receive the lower end of the adjustment element 53.

The adjustment element 53 is cylindrical with a central bore 71 threaded at its lower end 71*a* to receive the threaded tail portion 521 of the core element 51. The upper portion 71*b* of the adjustment element 53 is enlarged so that it can receive a pushrod lock nut (not shown). The adjustment element 53 also includes an upper head portion 75, and a lower body portion 76 which is adapted to fit within the upper axial bore 58 of outer element 52. The body portion 76 of the adjustment element 53 includes a groove 77 adapted to receive a locking stud 61 that passes radially through the outer element 52 to retain adjustment element 53 within outer element 52 while allowing relative rotational movement. The locking stud 61 extends radially through the outer element 52 and intersects the upper bore 58 through the threaded hole 56.

The snap ring installation tool just described operates to install a plate type snap ring in the snap ring groove cut by the groove cutting tool. Before the cam follower and pushrod spring assembly are inserted into the cam follower bore, the adjustment element 53 is rotated so that the pins 55 are located below the lower surface 51*a* of the core element and a snap ring is compressed and mounted on the pins 55. The tool is inserted over the pushrod and the pushrod adjusting nut is tightened to compress the spring. The total assembly is located in the cam follower bore and the adjustment element 53 is rotated. As adjustment element 53 is rotated, the outer element 52 moves away from core element head 51*b* and the pins 55 are pulled away from the lower surface 51*a* releasing the snap ring into the snap ring groove.

Figure 7:
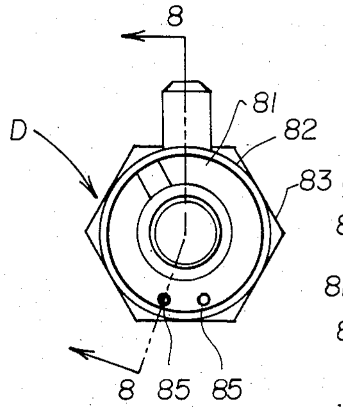
FIG. 7 is an end view of a second embodiment of a snap ring installation tool of the present invention.
Figure 8A:
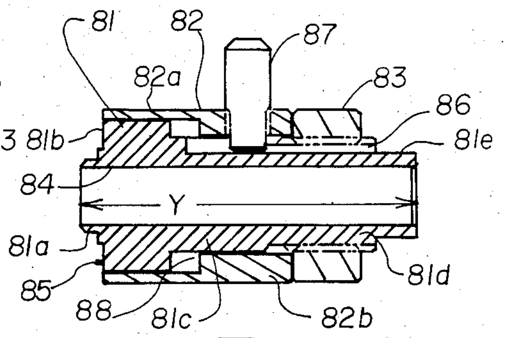
FIG. 8*a* is a longitudinal cross-sectional view along line 8—8 of FIG. 7 showing the snap ring tool in its expanded position.
Figure 8B:
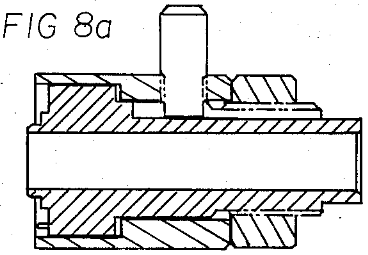
FIG. 8*b* is a longitudinal cross-sectional view along line 8—8 of FIG. 7 showing the snap ring tool in its contracted position.

An alternative embodiment of the snap ring installation tool designated by letter D is shown in FIGS. 7, 8 and 9. The tool D includes a core element 81, an outer element 82 and an adjustment nut 83. The core element 81 is made up of a cylindrical element with an axial bore 84 that has a radius and a length Y sufficient to fit over a pushrod between the upper spring retainer and lock nut. The core element 81 includes a lower head portion 81 and, the lower surface of which 81*b* which includes a configuration adapted to intermesh with the upper spring retainer and includes pins 85 to retain a snap ring in its compressed configuration. A central body segment 81*c* extends from the head portion 81*b* and includes a radius less than that of head portion 81*a*. A tail portion 81*d* is threaded to receive adjustment nut 83. The central segment 81*c* and tail portion 81*d* include a slot 86 to receive pin 87 described in greater detail below.

The outer element 82 is cylindrical in shape and includes a lower end 82*a* with an internal bore of a radius such that it can fit over head portion 81*a* of core element 81 and an upper end 82*b* with an internal bore of a radius such that it will fit over central segment 81*c* of core element 81. A pin 87 projects through the upper portion 82*b* of the outer element 82. The differing bore radii of outer element 82 forms a shoulder 88 which contacts the head portion 81*a* of the core element 81 to limit the movement of the outer element 82 over the core element 81. The upper tail portion 81*d* of the core element 81 includes flats 81*e* to allow a wrench to hold the core element stationery.

The alternate snap ring tool D is used to install a plate type snap ring in the groove cut by the groove cutting tool in much the same manner as described for the tool C. However, after the tool D with the snap ring compressed upon pins 85 is located on the pushrod in the bore, the nut 83 is tightened to pull the core element 81 into the outer element 82, and an impact upon the pushrod then releases the snap ring from the pins and allows it to spring into the groove.

The composite wrench of the present invention is used to adjust the valve clearance and fuel injector clearance for a Detroit diesel engine by allowing the operator to simultaneously grasp the flats of the pushrod and the pushrod lock nut. The concentric wrench, which is designated by letter G (FIG. 9), includes an inner socket 110 which includes an opening 111 to allow the socket to be positioned over a pushrod (not shown). A handle 112 extends radially outward from the bottom of socket 110 and perpendicular to the socket 110 for a short distance, and then upwardly parallel to the socket. The handle 112 extends a sufficient distance to clear the rocker arm and has a right angle bend 114 toward the lower socket center line. An alignment block 115 with a bore 116 on the lower socket center line is mounted on handle 112 at the center line of lower socket 110.

An upper socket 120 is located concentric with lower socket 110. The upper socket 120 includes an opening 121 which enables it to be located over a pushrod (not shown) and engage the pushrod lock nut. The upper socket 120 is concentric with the lower socket 110 and independently movable, both rotationally and axially. An inner handle 122 extends from the top of upper socket 120, which extends upwards generally parallel to handle 112 with a right angle bend 124 toward the socket center line. An orientation pin 125 is mounted on handle 122 on the upper socket center line, which extends into the bore 116 of orientation block 115 and includes a spacer 126 between the handles 114 and 124.

The concentric wrench of the present invention allows an operator to adjust the valve clearance and fuel injector clearance of a Detroit diesel engine easily and quickly. The openings 111 and 121 in the sockets allow the operator to locate the concentric wrench over the pushrod and engage the lower socket 110 with pushrod flats and the upper socket 120 with the pushrod lock nut. Valve and fuel injector clearance can be easily adjusted by rotating the pushrod which is threaded into the rocker arm. Upper socket 120 can then be independently moved both rotationally and axially to position the lock nut against the rocker arm. The handles 112 and 122 easily fit around the rocker arm assemble and the concentric alignment of the sockets provides for a much easier adjustment than was previously available when two separate wrenches were used.

The tools described above can be combined in a snap ring tool kit which allows an operator to repair the snap ring groove in a Detroit diesel engine cylinder head without removing the cylinder head from the engine block, install an oversized plate type snap ring and quickly adjust the valve and fuel injector clearance.

It should be understood that the foregoing description and drawings of the invention are not intended to be limiting, but are only exemplary of the inventive features which are defined in the claims.

What is claimed is:

1. A repair tool for cutting and enlarging a retainer ring groove in a pushrod bore, having an open top end and a bottom end closed by a cam follower, of a Detroit diesel engine cylinder head while the cylinder head is mounted to a Detroit diesel engine block, a portion of the pushrod bore where the retainer ring groove is located including a gap in the circumference of the pushrod bore in which a tool projecting beyond a radius of the pushrod bore can fit, the tool comprising:

a tubular cutting element having a longitudinal axial bore, adapted to fit within said pushrod bore around a pushrod to enlarge the retainer ring groove in said pushrod bore;

a tubular spacing and anchor element threadedly interconnected with said tubular cutting element having a longitudinal axial bore, adapted to fit within said pushrod bore around a pushrod, below said cutting member, in contact with the cam follower at the bottom closed end of the pushrod bore;

means for radially orienting a cutting member on said cutting element to project beyond the pushrod bore a predetermined distance; and means for rotating the cutting element when the repair tool is oriented in the pushrod bore with the cutting element and stop and anchor element threadedly interconnected and oriented in the pushrod bore around a pushrod with the cutting element positioned in the gap, for cutting and enlarging the retainer ring groove.

2. The repair tool of claim 1, wherein the cutting member includes a cutting blade mounted in an opening form perpendicular to the longitudinal axis of the repair tool.

3. The repair tool of claim 1, including means for radially adjusting said cutting element comprising a set screw movable in the repair tool perpendicular to a cutting blade for selectively holding the blade rigidly in place, and a second set screw contacting the cutting blade on a side of the repair tool opposite where the blade projects, for adjusting distance the blade projects from the repair tool.

4. The tool of claim 1, wherein said anchoring and spacing element includes at least one anchor member projecting outwardly therefrom, and adjustment means for moving said anchor in and out of engagement with the pushrod bore, the adjustment means including a set screw which is accessible when said cutting element upper and said spacing and anchor element are separated.

5. The tool of claim 1, wherein the cutting member is replacable with a second cutting member adapted to slightly enlarge the portion of the bore above the groove after the lower section is anchored in the bore and the upper section is rotated and threaded into the lower section.

6. The tool of claim 1, wherein the cutting member is aligned with the groove when the tubular cutting element and spacing and anchor element are threaded together, so that when the spacing and anchor element is released from the bore and the tool is rotated, the cutting member will operate to cut and enlarge the groove.

7. The tool of claim 1, and further including an annular receptacle formed on the tool below the cutting member for receiving cuttings as the groove is cut and enlarged.

8. The tool of claim 1, wherein the rotating means includes a hex head on the outer end of the tool adapted to receive a wrench.

9. A snap ring installation tool for installing a snap ring in a groove formed in a pushrod bore of an engine, comprising:

a core element having an outer end adapted to fit around a pushrod in said bore against a member located in the pushrod bore to be held in place by the snap ring;

an outer element adapted to move axially while concentrically oriented with said core element;

retaining means for holding a snap ring in a compressed condition; and disengaging means for driving a snap ring away from said retaining means.

10. The snap ring tool of claim 9, wherein said tool is of a length such that when oriented upon a Detroit Deisel engine pushrod between a lock nut and an upper spring retainer on said pushrod, a pushrod activating spring can be compressed by tightening the lock nut.

11. The snap ring tool of claim 9, wherein said retaining means comprises pins extending from a lower end of said core element and said disengaging means contacts and releases said snap ring upon abrupt downward movement of said snap ring tool.

12. The snap ring tool of claim 9, wherein said retaining means comprises pins extending from a lower end of said outer element and said disengaging means contacts and releases said snap ring upon downward axial concentric movement of said inner element.

13. The snap ring tool of claim 9, wherein said retaining means comprises a notch in said core element to receive fingers of a wire type snap ring and said disengaging means contacts and releases said wire type snap ring upon axial concentric movement of said outer element with respect to said inner element.

14. A kit for replacing a snap ring retaining means, and cutting and enlarging a snap ring groove for the retaining means located in a pushrod bore of an engine cylinder head of a Detroit Diesel engine while the cylinder head remains mounted to a cylinder block, a portion of the pushrod bore where the groove is located including a gap around a circumference of the pushrod bore in which a tool projecting beyond a radius of the pushrod bore can fit, the kit comprising:

a tool for cutting and enlarging the groove including:

a cutting member having a longitudinal axis adapted to enlarge the groove, means for aligning said cutting member longitudinally in the pushrod bore so that the cutting member can be located adjacent the groove, means for radially adjusting said cutting member to project beyond the radius of the bore a predetermined distance and means for rotating the cutting member when the tool is in the bore and the cutting member is positioned in the gap, for cutting and enlarging the groove;

a snap ring tool for installing a snap ring in the groove formed in the bore including a core element having a central longitudinal opening to fit around a pushrod and having an outer end adapted to fit against a member located around said pushrod in the bore to be held in place by the snap ring, a concentrically oriented axially movable outer element, retaining means for holding a snap ring in a compressed condition and disengaging means driving a snap ring away from said retaining means; and a wrench for adjusting valve and fuel injector clearance in a cam follower for a diesel engine, having independently movable sections, including a first inner socket section having an opening adapted to engage pushrod flats, a second outer socket section concentric with said first inner socket having an opening adapted to engage a lock nut, means for connecting said first and said second socket section so that they are independently rotatable and axially movable relative to each other, and rotating means connected to said first socket section and said second sockets section, respectively, for orienting and rotating said first and second socket sections independently.

15. The kit of claim 14, wherein the cutting member includes a cutting blade mounted in an opening formed perpendicular to the longitudinal axis of the tool for cutting.

16. The kit of claim 15, wherein the means for radially adjusting includes a set screw movable in the tool for cutting, perpendicular to the cutting member for selectively holding the member rigidly in place, and a second set screw engaging the cutting member on the side of the tool for cutting, opposite where the cutting member projects, for adjusting projection of the cutting member from the tool for cutting.

17. The kit of claim 14, wherein the cutting tool is formed of upper and lower sections joined through complementary threads, the upper section including the cutting member and the lower section including anchoring means for releasably anchoring the lower section in the pushrod bore.

18. The kit of claim 17, wherein the anchoring means includes at least one anchor member projecting outwardly from the lower section, and adjustment means for moving the anchor in and out of engagement with the pushrod bore, the adjustment means including a set screw which is accessible when the upper and lower sections are separated.

19. The kit of claim 17, wherein the cutting member is replaceable with a second cutting member adapted to slightly enlarge a portion of the pushrod bore above the groove after the lower section is anchored in the pushrod bore and the upper section is rotated and threaded into the lower section.

20. The kit of claim 17, wherein the cutting member is aligned with the groove when the upper and lower sections are threaded together, so that when the anchoring means is released from the pushrod bore and the cutting tool is rotated the cutting member will operate to cut and enlarge the groove.

21. The kit of claim 14, and further including an annular receptacle formed on the cutting tool below the cutting member for receiving cuttings as the groove is cut and enlarged.

22. The kit of claim 14, wherein the rotating means includes a hex head on an outer end of the tool for cutting adapted to receive a wrench.

23. The kit of claim 14, wherein said snap ring tool is of a length such that when oriented upon a Detroit Diesel engine pushrod between a lock nut and an upper spring retainer on said pushrod, a pushrod activating spring can be compressed by tightening the lock nut.

24. The kit of claim 14, wherein said retaining means comprises pins extending from the lower end of said core element and said disengaging means comprising said outer element when moved concentrically with said core element of said snap ring tool.

25. The kit of claim 14, wherein said retaining means comprises pins extending from a lower end of said outer element and said disengaging means comprises said inner element when moved concentrically with said outer element.

26. The kit of claim 14, wherein said retaining means comprises a notch in said core element to receive extending fingers of a wire type snap ring in said disengaging means comprising said outer element when moved with respect to said inner element in an axially concentric manner.

27. The kit of claim 14, wherein said first and second rotating means extend from said first socket and said second socket substantially parallel to a longitudinal center line of said sockets and including handles extending toward the sockets longitudinal center line.

28. The kit of claim 27, wherein said handles include a pin and block respectively, on the sockets center line to retain said first socket and said second sockets in an independently rotatable and axially movable orientation.

29. A wrench with independently movable sections for adjusting valve and fuel injector clearance in a cam follower for a diesel engine, comprising:

a first inner socket section having a longitudinal opening, adapted to engage pushrod flats of a cam-follower pushrod;

a second outer socket section concentric with said first inner socket section and including a longitudinal opening adapted to engage a lock nut located over a cam-follower pushrod of a diesel engine;

first means for interconnecting the first and second concentric socket sections so that they are independently rotatable and axially movable relative to each other comprising concentric contact of said first socket section with said second socket section; and independent first and second rotating means connected to the first and second concentric socket sections, respectively, for orienting and rotating the first and the second socket sections independently of each other including a second means for interconnecting the first and second concentric socket sections oriented on a longitudinal center line of said first and said second socket sections.

30. The wrench of claim 29, wherein said first and second rotating means extend from said first and said second socket substantially parallel to a longitudinal center line of said sockets and include handles extending toward the sockets longitudinal center line.

31. The wrench of claim 30, wherein said handles include a pin and block respectively on the sockets longitudinal center line to retain said first socket and said second socket in an independently rotatable and axially movable orientation.

32. The wrench of claim 30, wherein said first rotating means extends from a lower edge of said first inner socket and said second rotating means extends from an upper edge of said second outer socket.

* * * * *